United States Patent
Mackey et al.

(10) Patent No.: US 9,695,983 B2
(45) Date of Patent: Jul. 4, 2017

(54) FUEL TANK PARTITION AND METHOD OF USE

(71) Applicant: GP Strategies Corporation, Columbia, MD (US)

(72) Inventors: Michael Mackey, San Diego, CA (US); Douglas Sharp, Columbia, MD (US)

(73) Assignee: GP STRATEGIES CORPORATION, Elkridge, MD (US)

( * ) Notice: Subject to any disclaimer, the term of this patent is extended or adjusted under 35 U.S.C. 154(b) by 273 days.

(21) Appl. No.: 13/933,691

(22) Filed: Jul. 2, 2013

(65) Prior Publication Data

US 2014/0007943 A1    Jan. 9, 2014

Related U.S. Application Data

(60) Provisional application No. 61/669,337, filed on Jul. 9, 2012.

(51) Int. Cl.
  *F17C 1/00* (2006.01)

(52) U.S. Cl.
  CPC ........... *F17C 1/00* (2013.01); *Y10T 137/0318* (2015.04)

(58) Field of Classification Search
  CPC .......... F17C 2260/016; F17C 2265/061; F17C 2265/063; F17C 2265/065; F17C 13/002; F17C 13/004; F17C 2201/0185
  USPC ....... 137/574, 206, 209; 62/48.1, 50.1, 50.2, 62/49.2; 220/553–554, 563
  See application file for complete search history.

(56) References Cited

U.S. PATENT DOCUMENTS

| | | | | |
|---|---|---|---|---|
| 1,521,255 A * | 12/1924 | Scheu | ........................... | 220/553 |
| 2,840,259 A * | 6/1958 | Steidl | ........................... | 220/563 |
| 3,041,841 A * | 7/1962 | Henry | ........................... | 62/47.1 |
| 3,347,406 A * | 10/1967 | Katzenmeyer | ................ | 220/530 |
| 3,352,443 A * | 11/1967 | Sattelberg | ................ | F17C 3/022 |
| | | | | 220/560.12 |
| 3,486,302 A * | 12/1969 | Paynter | ................... | F02K 9/605 |
| | | | | 55/431 |
| 3,581,464 A * | 6/1971 | Bhuta | ................... | B01D 50/00 |
| | | | | 95/247 |
| 3,583,592 A * | 6/1971 | Kerfman | ................. | F17C 3/022 |
| | | | | 220/560.12 |
| 3,804,292 A * | 4/1974 | Chiti | ........................... | 220/88.3 |
| 4,863,055 A * | 9/1989 | Bietz | ........................... | 220/563 |
| 5,081,977 A * | 1/1992 | Swenson | ..................... | 123/527 |
| 5,127,230 A * | 7/1992 | Neeser et al. | ..................... | 62/7 |
| 5,165,246 A * | 11/1992 | Cipolla et al. | ................ | 62/47.1 |
| 5,404,918 A * | 4/1995 | Gustafson | .......................... | 141/1 |
| 5,644,921 A * | 7/1997 | Chowdhury | .................. | 62/48.1 |
| 5,771,946 A * | 6/1998 | Kooy et al. | ..................... | 141/82 |

(Continued)

*Primary Examiner* — Craig Schneider
*Assistant Examiner* — Nicole Wentlandt
(74) *Attorney, Agent, or Firm* — Finnegan, Henderson, Farabow, Garrett & Dunner, LLP

(57) ABSTRACT

Embodiments of the present disclosure may include a partition for a fuel tank. The partition may include a sheet of material extending laterally within an interior mid-region of the fuel tank. The sheet may have a length and a width that are at least substantially equal to a length and a width of the mid-region of the fuel tank, and the sheet may be shaped to conform to an interior perimeter of the mid-region of the fuel tank. The partition may also be configured to substantially divide the fuel tank into an upper interior region located above the partition and a lower interior region located below the partition.

20 Claims, 1 Drawing Sheet

(56) References Cited

U.S. PATENT DOCUMENTS

| | | | |
|---|---|---|---|
| 5,901,557 A * | 5/1999 | Grayson | F17C 1/00 62/45.1 |
| 6,354,088 B1 * | 3/2002 | Emmer et al. | 62/50.1 |
| 7,845,315 B2 * | 12/2010 | Leone | F01N 3/005 123/1 A |
| 7,975,869 B2 * | 7/2011 | Park | 220/563 |
| 8,235,242 B2 * | 8/2012 | Ha | 220/563 |
| 8,459,241 B2 * | 6/2013 | Dixon et al. | 123/525 |
| 8,783,281 B2 * | 7/2014 | Carter et al. | 137/206 |
| 2006/0010882 A1 * | 1/2006 | Oldham et al. | 62/50.1 |
| 2006/0053806 A1 * | 3/2006 | Tassel | 62/48.1 |
| 2011/0314839 A1 * | 12/2011 | Brook et al. | 62/49.1 |
| 2012/0090334 A1 * | 4/2012 | Harper et al. | 62/48.1 |
| 2013/0008185 A1 * | 1/2013 | Newman et al. | 62/48.1 |
| 2013/0112693 A1 * | 5/2013 | Shin | 220/563 |
| 2014/0007943 A1 * | 1/2014 | Mackey et al. | 137/1 |
| 2014/0197176 A1 * | 7/2014 | Pearce | 220/563 |

* cited by examiner

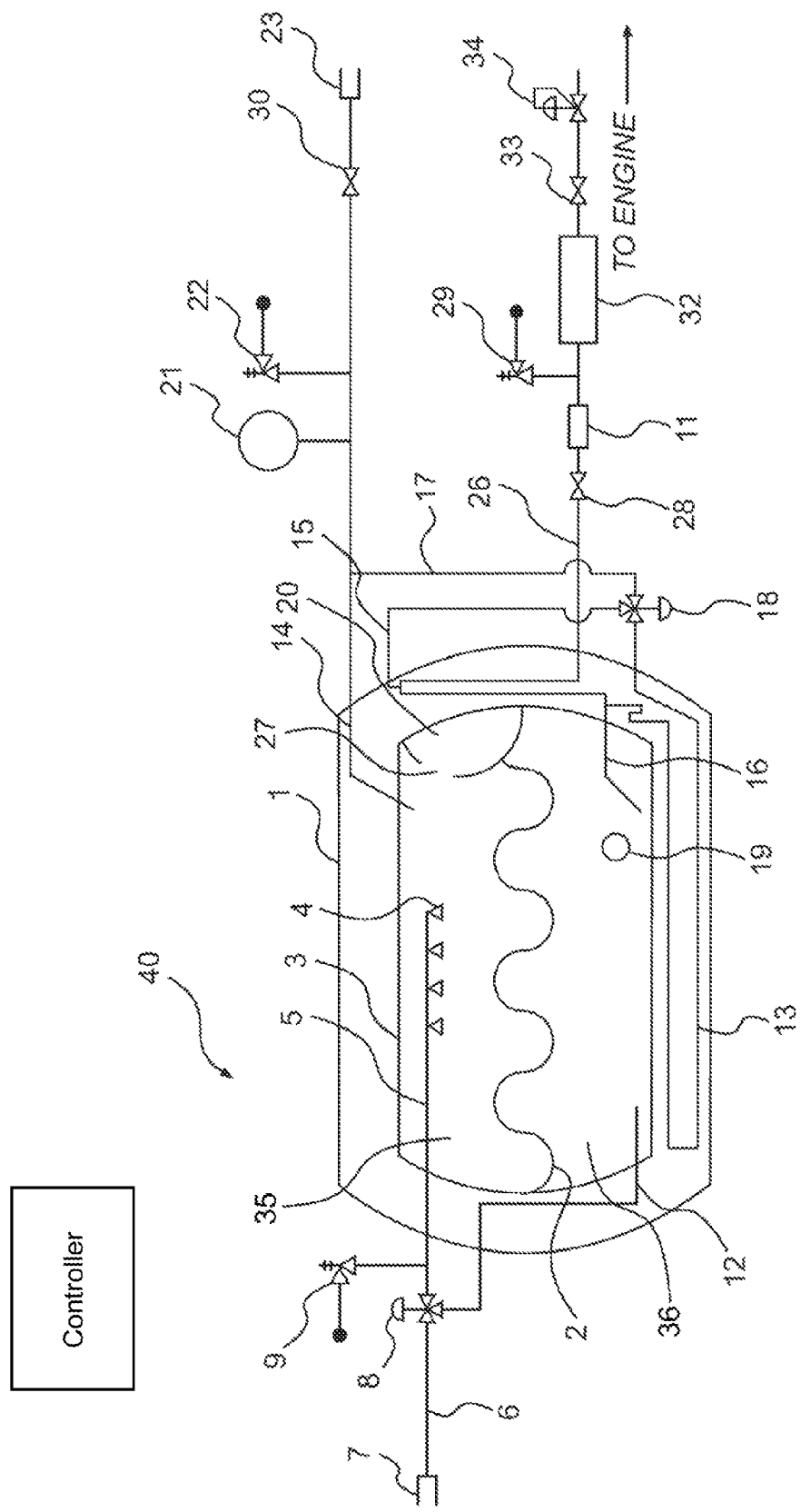

FUEL TANK PARTITION AND METHOD OF USE

I. CROSS-REFERENCE TO RELATED APPLICATION

This patent application claims the benefits of priority under 35 U.S.C. §§119-120 to U.S. Provisional Application No. 61/669,337, filed on Jul. 9, 2012, the entirety of which is incorporated herein by reference.

II. DESCRIPTION

Field of the Disclosure

This disclosure relates to fuel tanks, such as, for example, cryogenic fuel tanks, and more particularly, fuel tanks including a partition therein.

Background of the Disclosure

Generally speaking, liquefied natural gas (LNG) presents a viable fuel alternative to, for example, gasoline and diesel fuel. More specifically, LNG may be utilized as an alternative fuel to power certain vehicles. Currently, at least two types of onboard LNG vehicle fuel systems exist. The first type is a pressure-based LNG fuel system that relies on elevated LNG tank pressure to pressure-feed vaporized natural gas (NG) heated to approximately ambient temperature conditions to a natural gas engine. The second type is a pump-based LNG fuel system that relies on a high-pressure LNG pump inside the vehicle tank with a discharge pressure above approximately 3,000 psig to provide vaporized natural gas heated to approximately ambient temperature conditions to the natural gas engine.

The pressure-based LNG fuel system may require saturated LNG to be heated to a temperature of approximately −207° F. to −200° F. prior to being dispensed into a fuel tank such that the corresponding saturated pressure is approximately 80 to 100 psig. On the other hand, the pump-based LNG fuel system may operate better with colder LNG at a temperature of approximately between −259° F. and −240° F. for optimum pump operation and to inhibit tank venting. Saturated LNG having a saturated pressure in the range of approximately 80 to 100 psig is, however, approximately 13% less dense than cold LNG (e.g., LNG at a temperature of approximately −259° F.). The less dense saturated LNG therefore results in a reduced mileage range between re-fills for LNG vehicles filled with saturated LNG.

If cold LNG is dispensed into a pressure-based LNG fuel tank and the LNG tank is pressurized to between approximately 80 and 100 psig, vehicle movement may induce sloshing, which may cause the cold LNG to mix with the warmer NG vapor inside the fuel tank. This mixing may cause a drop in the fuel tank pressure to the corresponding saturated LNG pressure. If the saturated LNG pressure is too low, the fuel tank pressure may drop below a minimum required pressure; this drop in pressure may lead to an insufficient NG flow that may in turn cause the engine to stall, resulting in a potentially dangerous situation.

Typically, designing, building, and maintaining a fueling station capable of providing both saturated and cold LNG requires significant costs. Accordingly, there exists a need for a fuel tank capable of safely and efficiently using both saturated and unsaturated and/or cold LNG without losing fuel tank pressure during refueling and sloshing events. The present disclosure aims to overcome at least some of these deficiencies in the prior art.

III. SUMMARY OF THE DISCLOSURE

Embodiments of the present disclosure relate to fuel tank system such as partitions for fuel tanks. Various embodiments of the disclosure may include one or more of the following aspects.

In accordance with one embodiment, a partition for a fuel tank may include a sheet of material extending laterally within an interior mid-region of the fuel tank. The sheet may have a length and a width that are at least substantially equal to a length and a width of the mid-region of the fuel tank, the sheet may be shaped to conform to an interior perimeter of the mid-region of the fuel tank, and the partition may be configured to substantially divide the fuel tank into an upper interior region located above the partition and a lower interior region located below the partition.

Various embodiments of the partition may include one or more of the following features: the material may be semi-permeable; the fuel tank may be configured to hold a vapor fluid in the upper region and a liquid fluid in the lower region; the vapor fluid and the liquid fluid may be the same fluid; the fuel tank may be configured to hold cryogenic fluid; the partition may be undulated; and the material ay be pliable at a temperature of between approximately −180° F. and −420° F.

In accordance with another embodiment, a fuel tank for storing fluid may include a vessel for containing a quantity of fluid and a partition extending horizontally across an interior mid-region of the vessel and having a length and a width that are substantially equal to a length and a width of the mid-region of the vessel so that the partition substantially divides the vessel into an upper region located above the partition and a lower region located below the partition. The fuel tank may also include a first fill line fluidly communicating between the upper region and a region exterior to the vessel and a second fill line fluidly communicating between the lower region and the region exterior to the vessel.

Various embodiments of the fuel tank may include one or ore of the following features: the upper region may be configured to contain a vapor fluid and the lower region may be configured to contain a liquid fluid; the vapor fluid and the liquid fluid may be the same fluid; the fluid may include natural gas; the partition may be permeable to a fluid within the fuel tank; the fuel tank may further comprise a substantially enclosed, hollow ullage region located in the upper region and an ullage orifice communicating an inner area of the ullage region with the upper region; the first fill line may be configured to deliver a liquid to the upper region and the second fill line may be configured to deliver a liquid to the lower region; the fuel tank may be configured such that when a pressure within the fuel tank is above a pre-determined threshold, the first fill line delivers the liquid to the upper region and the second fill line does not deliver the liquid to the lower region, and when the pressure within the fuel tank is below the pre-determined threshold, the second fill line delivers the liquid to the lower region and the first fill line does not deliver liquid to the upper region; the fuel tank may include a controller and the first fill line may be fluidly connected to the second fill line, and the controller may automatically configure the first fill line to deliver the liquid to the upper region when the pressure is above a pre-determined threshold and automatically configure the second fill line to deliver the liquid to the lower region when the pressure is below the pre-determined threshold; the first fill line may include at least one spray head; the fuel tank may include an outer vessel surrounding the vessel; the fuel tank may include a sensor operably coupled to the fuel tank and configured to detect a parameter of the fuel tank; the parameter may be pressure; and the fuel tank may be configured to receive unsaturated liquid natural gas when the fuel tank contains saturated liquid natural gas at a pressure above approximately 80 psig.

In accordance with another embodiment, a fluid dispensing method may include dispensing the fluid to an upper region of a tank through a top fill line configured to dispense the fluid to the upper region when a pressure within the tank is above a pre-determined threshold and dispensing the fluid to a bottom region of the tank through a bottom fill line fluidly connected to the top fill line and configured to dispense the fluid to the lower region when the pressure is below a pre-determined threshold. In various embodiments, the tank may include a vessel for containing the fluid and a partition extending horizontally across an interior mid-region of the vessel, wherein the partition has a length and a width that are at least substantially equal to a length and a width of the mid-region of the vessel and the partition is shaped to conform to an interior perimeter of the mid-region of the vessel so that the partition substantially divides the vessel into the upper region located above the partition and the lower region located below the partition.

IV. BRIEF DESCRIPTION OF THE DRAWINGS

FIG. 1 illustrates a schematic representation of an exemplary fuel tank and partition, according to an embodiment of the present disclosure.

V. DETAILED DESCRIPTION

Reference will now be made in detail to the exemplary embodiments of the present disclosure described above and illustrated in the accompanying drawing. Although the present disclosure describes embodiments for use in connection with NG in both liquid and vapor states, those of ordinary skill in the art will appreciate that the principles described herein may be used with any suitable fuel (e.g., cryogenic fuel or other liquid with high vapor pressure).

The present disclosure relates to a partition for a fuel tank system. Disclosed embodiments of the fuel tank partition may inhibit the need for venting the fuel tank during refilling, may allow for more precise control of pressure within the fuel tank during refilling, may allow the fuel tank to receive and store both saturated and unsaturated and/or cold LNG without losing fuel tank pressure, and may reduce the incidence of sloshing events.

FIG. 1 depicts a schematic representation of a fueling system 40 of, for example, a vehicle configured to operate on NG, according to an exemplary embodiment of the present disclosure. Although FIG. 1 depicts a fueling system as including a number of components, those of ordinary skill in the art will readily recognize that one or more of the depicted components may be replaced and/or eliminated without altering the principles of the present disclosure.

Fueling system 40 can be configured for operation with liquids, including cryogenic liquids, such as LNG. While the present disclosure will refer to LNG as the liquid employed, it should be appreciated that any other liquid may be utilized by the present disclosure, including, but not limited to, cryogenic liquids such as liquid Oxygen, liquid Hydrogen, liquid Nitrogen, and/or any suitable liquid with high vapor pressure. Fueling system 40 can be configured to deliver LNG to an engine, for instance, the engine of a vehicle such as a truck or a ship (not shown). In addition to vehicles, any device with an engine operating on NG may utilize fueling system 40. Moreover, fueling system 40 described herein can be configured to supply pressurized LNG to any use device, not just an engine, that may require a supply of pressurized LNG, such as the delivery of liquids to use devices for industrial or non-transportation-related purposes.

Fueling system 40 may comprise an outer vessel 1 and an inner vessel 3. Inner vessel 3 can be configured to contain a quantity of LNG and a quantity of vaporized NG, together referred to herein as "LNG fluid." Thus, fluid, as used herein, may refer to either a liquid or a gas. In some embodiments, fueling system 40 may further include insulation between outer vessel 1 and inner vessel 3. In other embodiments, there may be no outer vessel 1 and insulation may substantially surround inner vessel 3. Moreover, outer vessel 1 may include a vacuum vessel. In alternative embodiments, fueling system 40 may include only one vessel, or alternatively, may include more than two vessels. Fueling system 40 may include any type of vessel suitable for containing fluids.

Inner vessel 3 may further include a dedicated ullage region 20, shown in FIG. 1 as a semi-spherical region. Dedicated ullage region 20 may be located in an upper region of inner vessel 3. Dedicated ullage region 20 may further include an ullage orifice 27 allowing communication between dedicated ullage region 20 and the remaining interior of inner vessel 3. Dedicated ullage region 20 may be configured to contain a quantity of LNG or vaporized NG. Dedicated ullage region 20 in this embodiment is an at least partially hollow, half sphere, though ullage region 20 may have any suitable hollowed shape, for instance, a rectangle or an oval.

Inner vessel 3 may further include a partition 2 extending laterally across a portion of inner vessel 3. Partition 2 may extend to each side of inner vessel 3, dividing inner vessel 3 into an upper region 35 located above partition 2 and a lower region 36 located below partition 2. In one embodiment, for example, partition 2 may extend across a middle region of inner vessel 3, while in other embodiments, partition 2 may extend across an upper or lower region of inner vessel 3, dividing inner vessel 3 unequally. Herein, "upper region 35" will be used to refer to a region located above partition 2, and "lower region 36" will be used to refer to a region located below partition 2. The periphery of partition 2 may conform to the shape of the interior space of inner vessel 3. Partition 2 may extend in a straight plane across inner vessel 3, or partition 2 may include a non-straight pattern, for instance a wave-like or irregular plane. Partition 2 may divide inner vessel 3 along a transverse plane, or may extend across two different horizontal locations on the interior space of inner vessel 3, so that partition 2 divides inner vessel 3 along an angle.

Partition 2 may be formed of a rigid or a flexible material, or both rigid and flexible materials. Partition 2 may be formed of one or more than one layers of material. Partition 2 may be formed of one type of material, or of layers of more than one type of material.

In one embodiment, partition 2 can include a membrane. This membrane can be formed of a semi-permeable or permeable material. For instance, in embodiments including a semi-permeable membrane, vapor NG may be able to pass through partition 2, or LNG may be able to pass through partition 2. For instance, vapor from boiling LNG located in lower region 36 may be able to pass through partition 2 into upper region 35 of inner vessel 3. Additionally, LNG in upper region 35 may be able to pass through partition 2 into lower region 36 of inner vessel 3. A degree of permeability may be achieved by using different materials, using multiple layers of materials, by altering the shape, weave pattern, or thickness of partition 2, or by any other suitable means. In one embodiment, for example, permeability may be achieved by creating holes or pores in partition 2. For instance, partition 2 may include woven materials, and varying the tightness of the weave may vary the permeability of partition 2.

Partition 2 can also be formed of a pliable material. In some embodiments, partition 2 can be configured for use with cryogenic liquids. As such, partition 2 can be formed of materials that are pliable at temperatures appropriate for use with cryogenic fluids, such as, for example, liquid Oxygen, liquid Hydrogen, liquid Nitrogen, and/or any cryogenic fluid. For instance, partition 2 may be formed of material that is pliable at a range of approximately −180° F. to −420° F. For instance, partition 2 can be formed of GORE-TEX®, Teflon®, woven stainless steel fabric, or other material suitable for the specific temperature and pressure conditions.

Inner vessel 3 may be configured to receive a supply of LNG fuel from, e.g., a refilling station. A fuel supply line 6 may be fluidly connected to a fill nozzle 7 configured to receive fuel from a fuel dispenser (not shown). Fuel supply line 6 may further include a fill check valve and/or any other valve known to those skilled in the art. In the embodiment of FIG. 1, for example, fuel supply line 6 may include a fill regulator valve 8. Fill regulator valve 8 can be capable of at least four configurations. A first configuration can allow liquid to flow through fuel supply line 6, through regulator valve 8, and into a top fill line 5. A second configuration can allow liquid to flow through fuel supply line 6, through regulator valve 8, and into a bottom fill line 12. A third configuration can allow liquid to flow through fuel supply line 6 and through regulator valve 8 with a portion of liquid flowing into top fill line 5 and the remaining portion of liquid flowing into bottom fill line 12. Moreover, in a fourth configuration, fill regulator valve 8 may substantially prevent flow therethrough. Fill regulator valve 8 can include any suitable valve known in the art, including, e.g., one-way or multi-way valves, ball valves, check valves, and/or butterfly valves, safety pressure release valves, self-actuating valves, shutoff valves, excess flow valves, etc. As shown in FIG. 1, fill regulator valve 8 can include a three-way regulator valve.

Top fill line 5 may be fluidly coupled to fill regulator valve 8 and may extend from fill regulator valve 8, through outer vessel 1, and into upper region 35 of inner vessel 3. Top fill line 5 can further include at least one primary pressure relief device 9 fluidly coupled to a portion of top fill line 5 and located exterior to inner vessel 3 and exterior to outer vessel 1.

Top fill line 5 may further include one or more spray heads 4 configured to discharge a quantity of LNG from top fill line 5 into upper region 35 of inner vessel 3. In some embodiments, like the one shown in FIG. 1, top fill line 5 may include a plurality of spray heads 4. Although the depicted embodiment illustrates four spray heads 4, top fill line 5 may include a greater or lesser number of spray heads. Spray heads 4 may be configured to discharge a quantity, for instance, a spray, a mist, or a stream, of LNG into inner vessel 3. For instance, spray heads 4 may be defined by holes in top fill line 5. In some embodiments, spray heads 4 may include fixtures, for instance, nozzle(s), sprinkler head(s), faucet(s), shower head(s), deflection plate(s) or any other suitable mechanisms for discharging fluid. In some embodiments, spray heads 4 may be adjustable to allow control over the pressure, velocity, or quantity, for instance, of LNG discharged. In the adjustable embodiment, spray heads 4 may be controlled electronically or manually. Adjustments may be made automatically by a control system or according to user input.

Fill regulator valve 8 may also be fluidly connected to a bottom fill line 12. Fill regulator valve 8 may be capable of one or more additional configurations. One configuration, for example, can allow liquid to flow through fuel supply line 6, through fill regulator valve 8, and into bottom fill line 12. A further configuration may substantially prevent liquid from flowing through fill regulator valve 8 and into bottom fill line 12. Bottom fill line 12 may extend from fill regulator valve 8, through outer vessel 1, and into lower region 36 of inner vessel 3. More particularly, as illustrated in FIG. 1, bottom fill line 12 may pass into outer vessel 1 and extend for a distance between outer vessel 1 and inner vessel 3. Alternatively, bottom fill line 12 may pass straight through outer vessel 1 and into inner vessel 3.

The system configuration described above can allow fueling system 40 to receive unsaturated, cold LNG from a fuel station, even if fueling system 40 already contains a quantity of saturated LNG and fueling system 40 is pressurized to between approximately 80 and 150 psig or higher for use with a saturated LNG fuel system.

To fill fueling system 40, a user can connect fill nozzle 7 to an LNG dispenser (not shown), and initiate dispensing from, e.g., a bulk storage tank. Fill regulator valve 8 can be set to the first configuration, which can allow LNG to flow from the dispenser, through fill nozzle 7, through fuel supply line 6, through valve 8, and into top fill line 5. Spray heads 4, operatively coupled to a region of top fill line 5 inside inner vessel 3, can discharge LNG into upper region 35 of inner vessel 3 above partition 2. In one embodiment, for example, cold LNG may be discharged from spray heads 4 into upper region 35 of inner vessel 3 that already includes saturated LNG. This may reduce tank pressure as the cold LNG condenses warmer NG vapor in upper region 35 of inner vessel 3.

In some embodiments, fueling system 40 may include at least one measuring device 19, 21. Measuring device 19, 21 could include any suitable measuring device, including a pressure gauge, a manometer, a vacuum gauge, a sensor, a vented gauge, a sealed gauge, a hydrostatic gauge, a piston gauge, a liquid column gauge, an aneroid gauge, a differential pressure transmitter, or a Bourdon gauge, for instance. Measuring device 19, 21 may further be configured to measure absolute pressure, gauge pressure, differential pressure, barometric pressure, static pressure, dynamic pressure, total pressure, or use any other suitable parameter of level. In one embodiment, for example, one measuring device 19 may be a liquid level measuring device configured to measure the liquid level in inner vessel 3, and another measuring device 21 may be a pressure measuring device.

In some embodiments, when the pressure in inner vessel 3 drops below a certain threshold (e.g., constant or adjustable), a control system may configure fill regulator valve 8 to prevent LNG from flowing into top fill line 5, stopping spray heads 4 from discharging LNG to upper region 35 of inner vessel 3. In another embodiment, a device operator may be able to read pressure measurements from a measuring device 21 and configure fill regulator valve 8 to prevent LNG from flowing into top fill line 5. In another exemplary embodiment, a self-actuating valve may be used to stop the flow of LNG into top fill line 5.

When the pressure in inner vessel 3 has dropped to a certain threshold level, the control system, a self-actuating valve, or a user, for example, can configure fill regulator valve 8 to allow LNG to flow into bottom fill line 12 and into lower region 36 of inner vessel 3. Directing the cold LNG into lower region 36 of inner vessel 3 can help prevent the cold LNG from contacting any vapor present in upper region 35 of inner vessel 3. This may prevent the cold LNG from decreasing the temperature of the vapor, which could cause the pressure in inner vessel 3 to collapse. Accordingly, this configuration may further help to maintain the pressure in inner vessel 3.

In another embodiment, the pressure in inner vessel 3 may be below a certain threshold at the start of fueling. In this embodiment, fill regulator valve 8 can be configured to allow LNG to flow into nozzle 7, through supply line 6, into bottom fill line 12, and into lower region 36 of inner vessel 3 throughout the entire fueling process.

Accordingly, inner vessel 3 can be configured to be top-filled with cold LNG if the pressure in inner vessel 3 is above a certain pressure, bottom-filled with cold LNG if the pressure in inner vessel 3 is below a certain pressure, or top-filled and then bottom-filled if the pressure in inner vessel 3 is high at the start of fueling, but then drops during the course of fueling.

Once inner vessel 3 is filled with a suitable amount of LNG, the dispenser can automatically stop dispensing LNG, or alternatively, a user can stop dispensing LNG manually. In one embodiment, fill level can be detected when the LNG level in inner vessel 3 at least partially covers ullage orifice 27 of dedicated ullage region 20 which may contain a quantity of vaporized NG. When this occurs, the pressure inside inner vessel 3 may increase rapidly. When the pressure in inner vessel 3 increases relative to the pressure of the dispenser (not shown), the pressure gradient between the dispenser and inner vessel 3 decreases, and the flow of LNG into inner vessel 3 may slow or stop. Either a processor, a user, or some other device may detect this decrease in flow and may stop the dispensing of LNG into inner vessel 3. In other embodiments, fill level can be determined through the use of pressure sensors, flow sensors, level sensors, weight sensors, or any other suitable means known in the art.

Accordingly, partition 2 can allow lower region 36 of inner vessel 3 to be filled with cold LNG without collapsing the pressure in inner vessel 3 by limiting contact between the cold LNG being dispensed and vaporized NG and/or saturated LNG already present in inner vessel 3. Further, once inner vessel 3 is filled and the vehicle is in motion, partition 2 can help minimize cold LNG from contacting and mixing with any vapor in upper region 35 of inner vessel 3 and any vapor in dedicated ullage region 20 of inner vessel 3. If the vehicle undergoes any sudden movements, such as, for example, a sudden stop, partition 2 could decrease any potential sloshing of LNG in inner vessel 3 that could result in a collapse of pressure in inner vessel 3. In another aspect of this disclosure, partition 2 can help contain the LNG in inner vessel 3 in lower region 36 of inner vessel 3 near liquid withdrawal line 16 to maximize the amount of usable LNG in inner vessel 3. Further, by allowing for use of cold LNG in inner vessel 3, partition 2 can increase the LNG inner vessel 3 hold time before venting is required, because cold LNG takes longer to reach a set pressure. Moreover, by allowing for use of cold LNG in inner vessel 3, partition 2 can increase mileage for vehicles, because cold LNG may be more dense than saturated LNG.

Another aspect of this disclosure relates to a pressure maintenance system for use within fueling system 40. Inner vessel 3 can be fluidly coupled to a vent line 14 and liquid withdrawal line 16. Vent line 14 may protrude into an upper region of inner vessel 3 so that vaporized NG in inner vessel 3 may flow into vent line 14. In one embodiment, vent line 14 can extend into upper region 35 of inner vessel 3. Vent line 14 can exit inner vessel 3, extend through outer vessel 1, and extend out of fueling system 40. Vent line 14 can include a region distal to fueling system 40. A vent receptacle 23 can be fluidly coupled to a distal region of vent line 14 exterior to fueling system 40. Vent receptacle 23 may allow fueling system 40 to be vented by releasing vapor from inner vessel 3 through vent line 14.

Vent line 14 can further include one or more vent valves 30. Vent valve 30 can be capable of at least two configurations: a first configuration allowing vapor to flow through vent line 14, through vent valve 30, to vent receptacle 23, and a second configuration substantially preventing vapor from flowing through vent line 14, through vent valve 30. Vent line 14 can also include at least one primary pressure relief device 9 and at least one secondary pressure relief device 22, one or both of which may be configured as additional means of venting fueling system 40 or vent line 14 and preventing excessive pressure buildup in inner tank 3. Vent line 14 can include any suitable pressure relief device known in the art, including, e.g., check valves, and/or butterfly valves, safety pressure release devices, relief valves, burst discs, self-actuating valves, etc.

As previously discussed, fueling system 40 may include one or more measuring devices 19, 21. One of measuring devices 21 may be included with vent line 14. Measuring device 21 may be configured for measuring, e.g., the pressure of inner vessel 3, vent line 14, or fueling system 40. Accordingly, measuring device 21 may include any suitable measuring device, including a pressure gauge, a thermometer, a manometer, a vacuum gauge, a sensor, a vented gauge, a sealed gauge, a hydrostatic gauge, a piston gauge, a liquid column gauge, an aneroid gauge, a pressure transmitter, or a Bourdon gauge, for instance. Pressure measuring device 21 may measure absolute pressure, gauge pressure, differential pressure, barometric pressure, static pressure, dynamic pressure, total pressure, or may measure any other suitable parameter of the fluid within vent line 14.

Liquid withdrawal line 16 may protrude into lower region 36 of inner vessel 3 such that LNG in inner vessel 3 can flow into engine supply line 26. Liquid withdrawal line 16 can exit inner vessel 3, extend through outer vessel 1, and extend out of fueling system 40. Engine supply line 26 can include a region distal to fueling system 40. A distal region of engine supply line 26 may be configured to supply fluid to an engine (not shown). A distal region of engine supply line 26 can also include one or more valves, for instance, one or more excess flow valves 33 and/or one or more engine regulator valves 34 configured to control the flow and/or pressure of fluid in engine supply line 26 to the engine. Engine supply line 26 can include any suitable valve known in the art, including, e.g., ball valves, check valves, and/or butterfly valves, safety pressure release devices, self-actuating valves, shutoff valves, excess flow valves, etc.

Engine supply line 26 can also include one or more heat exchangers 32 fluidly connected thereto and located between fueling system 40 and the engine. Heat exchanger 32 can vaporize and warm the LNG from engine supply line 26 to a suitable temperature for use by the engine. Heat exchanger 32 can include any suitable mechanism for heating liquid known in the art, including but not limited to, an electric, hot water heat exchanger or a glycol heat exchanger. Further, heat exchanger 32 can include a shell and tube heat exchanger, a plate heat exchanger, a plate-fin heat exchanger, a phase-change heat exchanger, or any other suitable heat exchanger. In some embodiments, heat exchanger 32 may use engine coolant to warm the LNG. In some embodiments, heat exchanger 32 may warm the LNG by facilitating transfer of energy with ambient conditions. In some embodiments, heat exchanger 32 may at least partially vaporize the LNG.

Engine supply line 26 can further include one or more liquid withdrawal shutoff valves 28. Liquid withdrawal shutoff valve 28 can be capable of at least two configurations: a first configuration allowing fluid to flow through engine supply line 26, through liquid withdrawal shutoff valve 28 to heat exchanger 32, and a second configuration substantially preventing fluid from flowing through engine supply line 26, through liquid withdrawal shutoff valve 28, and to heat exchanger 32. Engine supply line 26 can also include one or more liquid withdrawal pressure relief devices 29 to prevent over pressurizing fueling system 40 or engine supply line 26. In one embodiment, liquid withdrawal pressure relief device 29 can be located between heat exchanger 32 and fueling system 40.

FIG. 1 further illustrates that liquid withdrawal line 16 may be fluidly coupled to pressure building coil 13, or a separate liquid line may connect lower region 36 to pressure building coil 13. In the embodiment shown in FIG. 1, vent line 14 and pressure building line 17 can be fluidly coupled via a combined pressure building economizer (PBE) regulator valve 18. In addition, liquid withdrawal line 16 and economizer line 15 can be fluidly coupled via combined PBE regulator valve 18. Combined PBE regulator valve 18 can include one or more than one regulator valves 18 and may include any suitable valve known to those skilled in the art, including, e.g., ball valves, check valves, and/or butterfly valves, safety pressure release valves, self-actuating valves, shutoff valves, excess flow valves, regulators, etc. The functions of the PBE regulator valve described above can be provided with a single valve or multiple valves.

Combined PBE regulator valve 18 may include three or more configurations. In a first configuration, combined PBE regulator valve 18 can allow LNG to flow from liquid withdrawal line 16 into pressure building coil 13, where the LNG is vaporized. The vaporized NG may flow through combined PBE regulator valve 18 into pressure building line 17 and into upper region 35 of inner vessel 3 to increase inner vessel 3 pressure. In a second configuration, combined PBE regulator valve 18 can allow NG vapor from upper region 35 of inner vessel 3 to flow through vent line 14, through combined PBE regulator valve 18, and into economizer line 15. Because the tie-in point of economizer line 15 and liquid withdrawal line 16 is at substantially the same level as the top of inner vessel 3, an increase in pressure at the bottom of inner vessel 3 due to the weight of the LNG liquid may be neutralized, and NG vapor can flow into engine supply line 26. This NG flow out the top of inner tank 3 may reduce tank pressure.

A third configuration of combined PBE regulator valve 3 may substantially prevent fluid flow through pressure budding coil 13 and pressure building line 17 and prevent fluid flow though pressure building line 17 and economizer line 15, allowing only LNG to flow from liquid withdrawal line 16 to engine supply line 26. In one embodiment, if the pressure in inner vessel 3 rises above a certain threshold, for instance, approximately 110 psig, combined PBE regulator valve 18 may open to allow vaporized NG from vent line 14 to flow through pressure building line 17, through combined PBE regulator valve 18 and economizer line 15, and into fuel supply line 26 to reduce inner vessel 3 pressure. In some embodiments, this threshold may be adjustable. Additionally, in some embodiments, combined PBE regulator valve 18 may be self-acting, user controlled, or a control system (not shown) may be used to operate combined PBE regulator valve 18.

In another aspect of the disclosure, if the pressure in inner vessel 3 is below a certain threshold, for instance, approximately 90 psig, combined PBE regulator valve 18 may open to allow LNG to flow from liquid withdrawal line 16 into pressure building coil 13, through PBE regulator valve 18 into pressure building line 17 and vent line 14, and into upper region 35 of inner vessel 3 to increase pressure in inner tank 3.

In addition, fueling system 40 may include pressure building coil 13, which can extend a substantial portion of the length of the inside or outside of outer vessel 1 and may double back around such that it returns to the side of fueling system 40 where a first end of pressure building coil 13 originated. Alternatively, in another embodiment, pressure building coil 13 may wrap around the perimeter of fueling system 40 in either a horizontal or a vertical direction one time or multiple times. In other embodiments, pressure building coil 13 could create a wave pattern, a zigzag pattern, or any other suitable configuration along any side or sides of fueling system 40.

It should be appreciated that any steps of filling, maintaining, or utilizing fuel from fueling system 40 listed in this disclosure can be automated through the use of a control system, can be manual, or can be user-directed. User input, as discussed herein, can consist of any suitable means for inputting commands into a control system, for instance, operating at least one button, switch, lever, trigger, voice or motion activated, touch screen, e.g., or any combination thereof. Moreover, automated portions of fueling system 40 can include override mechanisms that allow the user to interrupt control of a control system over fueling system 40. Further, the steps disclosed herein can occur in any order, or may be repeated as many times as desired.

Portions of lines, including, for instance, supply lines, regulator lines, vent lines, and pressure building coils, described in this disclosure are listed as discrete sections for convenience. Lines can be continuous or discrete sections fluidly connected. Additionally, lines can include any number of valves. The valves can include any suitable type of valve, for instance, 1-way or multi-way valves, or any combination thereof. Valves can include any suitable valve known in the art, including, e.g., ball valves, check valves, and/or butterfly valves, safety pressure release valves, self-actuating valves, shutoff valves, excess flow valves, etc. Further, lines may include a number of nozzles or orifices in addition to those listed in this description. The nozzles can include any suitable type of nozzle, for instance, venturi, sparger, or flow nozzles. Additionally, the components listed herein may be replaced with any suitable component capable of performing the same or like functions. Different embodiments may alter the arrangement of steps or components, and the invention is not limited to the exact arrangements described herein.

The many features and advantages of the present disclosure are apparent from the detailed specification, and thus, it is intended to cover all such features and advantages of the present disclosure that fall within the true spirit and scope of the present disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

What is claimed is:

1. A partition for use within an enclosed fuel tank, comprising:
   a flexible sheet of woven, at least semi-permeable material extending laterally within an interior mid-region of the fuel tank, wherein the sheet is characterized by a non-straight, undulated body with a length and a width that are at least substantially equal to a length and a width of the mid-region of the fuel tank and the sheet is shaped to conform to an interior perimeter of the mid-region of the fuel tank, and wherein the partition is configured to substantially divide the fuel tank into an upper interior region located above the partition and a lower interior region located below the partition,
   wherein the material is at least permeable to a vapor fluid stored in the fuel tank.

2. The partition of claim 1, wherein the fuel tank is configured to hold the vapor fluid in the upper region and a liquid fluid in the lower region.

3. The partition of claim 2, wherein the vapor fluid and the liquid fluid are the same fluid.

4. The partition of claim 1, wherein the fuel tank is configured to hold cryogenic fluid.

5. The partition of claim 1, wherein the material is pliable at a temperature of between approximately −180° F. and −420° F.

6. An enclosed fuel tank for storing fluid, comprising:
   a vessel for containing a quantity of a fluid;
   a partition within the enclosed fuel tank formed of a flexible sheet of woven, at least semi-permeable material extending horizontally across an interior mid-region of the vessel and having a length and a width that are at least substantially equal to a length and a width of the mid-region of the vessel, and wherein the partition is characterized by a non-straight, undulated body and shaped to conform to an interior perimeter of the mid-region of the vessel so that the partition substantially divides the vessel into an upper region located above the partition and a lower region located below the partition,
   wherein the material is at least permeable to a vapor portion of the fluid stored in the vessel;
   a first fill line fluidly communicating between the upper region and a region exterior to the vessel; and
   a second fill line fluidly communicating between the lower region and the region exterior to the vessel.

7. The fuel tank of claim 6, wherein the upper region is configured to contain the vapor portion of the fluid and the lower region is configured to contain a liquid portion of the fluid.

8. The fuel tank of claim 6, wherein the fluid includes natural gas.

9. The fuel tank of claim 6, wherein the material is permeable to a liquid portion of the fluid within the fuel tank.

10. The fuel tank of claim 6, further comprising:
   a substantially enclosed, hollow ullage region located in the upper region; and
   an ullage orifice communicating an inner area of the ullage region with the upper region.

11. The fuel tank of claim 6, wherein the first fill line is configured to deliver a first liquid portion of the fluid to the upper region and the second fill line is configured to deliver a second liquid portion of the fluid to the lower region.

12. The fuel tank of claim 11, wherein the fuel tank is configured such that when a pressure within the fuel tank is above a pre-determined threshold, the first fill line delivers the first liquid portion of the fluid to the upper region and the second fill line does not deliver the second liquid portion of the fluid to the lower region, and when the pressure within the fuel tank is below the pre-determined threshold, the second fill line delivers the second liquid portion of the fluid to the lower region and the first fill line does not deliver the first liquid portion of the fluid to the upper region.

13. The fuel tank of claim 11, further including a controller, wherein the first fill line is fluidly connected to the second fill line and the controller automatically configures the first fill line to deliver the first liquid portion of the fluid to the upper region when the pressure is above a pre-determined threshold and automatically configures the second fill line to deliver the second liquid portion of the fluid to the lower region when the pressure is below the pre-determined threshold.

14. The fuel tank of claim 6, wherein the first fill line includes at least one spray head.

15. The fuel tank of claim 6, further comprising an outer vessel surrounding the vessel.

16. The fuel tank of claim 6, further comprising a sensor operably coupled to the fuel tank and configured to detect a parameter of the fuel tank.

17. The fuel tank of claim 16, wherein the parameter is pressure.

18. The fuel tank of claim 6, wherein the fuel tank is configured to receive unsaturated liquid natural gas when the fuel tank contains saturated liquid natural gas at a pressure above approximately 80 psig.

19. A fluid dispensing method, comprising:
   dispensing a first portion of a fluid to an upper region of an enclosed tank located above a flexible sheet of woven, at least semi-permeable partition extending laterally within an interior mid-region of the tank through a top fill line configured to dispense the fluid to the upper region when a pressure within the tank is above a pre-determined threshold, wherein the partition is characterized by a non-straight, undulated body; and
   dispensing a second portion of the fluid to a bottom region of the tank located below the woven, at least semi-permeable partition through a bottom fill line fluidly connected to the top fill line and configured to dispense the fluid to the lower region when the pressure is below a pre-determined threshold,
   wherein the partition is at least permeable to a vapor portion of the fluid stored in the tank.

20. The fluid dispensing method of claim 19, wherein the tank includes a vessel for containing the fluid and the partition has a length and a width that are substantially equal to a length and a width of the mid-region of the vessel and the partition is shaped to conform to an interior perimeter of the mid-region of the vessel so that the partition substantially divides the vessel into the upper region located above the partition and the lower region located below the partition.

* * * * *